United States Patent [19]

Linnersten

[11] Patent Number: 5,152,890
[45] Date of Patent: Oct. 6, 1992

[54] FILTER DEVICE

[75] Inventor: Staffan B. Linnersten, New Port Richey, Fla.

[73] Assignee: Pall Corporation, Glen Cove, N.Y.

[21] Appl. No.: 427,563

[22] Filed: Oct. 27, 1989

[51] Int. Cl.$^5$ .................................... B01D 27/07
[52] U.S. Cl. .................................... 210/315; 210/338; 210/458; 210/497.01; 210/497.2; 55/498
[58] Field of Search .................. 55/498; 210/315, 337, 210/338, 458, 497.01, 497.2

[56] References Cited

U.S. PATENT DOCUMENTS

| | | | |
|---|---|---|---|
| 513,215 | 1/1894 | Strater | 210/497.3 |
| 1,262,495 | 4/1918 | Hills | 210/315 |
| 1,329,138 | 1/1920 | Olleo | 55/484 |
| 2,023,423 | 12/1935 | Kleckner et al. | 210/165 |
| 2,421,705 | 6/1947 | Kasten | 183/73 |
| 2,463,722 | 3/1949 | Spraragen | 183/71 |
| 3,209,916 | 10/1965 | May et al. | 210/484 |
| 3,223,241 | 12/1965 | Kasten | 210/338 |
| 3,262,563 | 7/1966 | Pall | 210/90 |
| 3,262,564 | 7/1966 | Pall et al. | 210/90 |
| 3,262,565 | 7/1966 | Silverwater | 210/90 |
| 3,280,982 | 10/1966 | Barto | 210/315 |
| 3,349,919 | 10/1967 | Royer et al. | 210/338 |
| 3,420,377 | 1/1969 | Vandersip | 210/315 |
| 3,467,256 | 9/1969 | Humbert, Jr. et al. | 210/338 |
| 3,616,617 | 11/1971 | De Groote | 55/307 |
| 3,672,130 | 6/1972 | Sullivan et al. | 55/323 |
| 3,680,286 | 8/1972 | Nostrand et al. | 55/484 |
| 3,710,562 | 1/1973 | McKenzie | 55/487 |
| 4,104,170 | 8/1978 | Nedza | 210/487 |
| 4,135,899 | 1/1979 | Gauer | 210/338 |
| 4,203,739 | 5/1980 | Erdmannsdorfer | 55/323 |
| 4,211,543 | 7/1980 | Tokar et al. | 55/485 |
| 4,243,535 | 1/1981 | Behrends et al. | 210/315 |
| 4,264,344 | 4/1981 | Ludecke et al. | 55/313 |
| 4,278,455 | 7/1981 | Nardi | 55/337 |
| 4,390,354 | 6/1983 | Witchell | 55/337 |
| 4,634,458 | 1/1987 | Craig | 55/316 |
| 4,783,271 | 1/1988 | Silverwater | 210/315 |
| 4,812,235 | 3/1989 | Seleman et al. | 210/247 |
| 4,909,937 | 3/1990 | Hoffman et al. | 210/315 |

FOREIGN PATENT DOCUMENTS

| | | |
|---|---|---|
| 0244641 | 1/1961 | Australia . |
| 0090383 | 3/1983 | European Pat. Off. . |
| 2726670 | 1/1979 | Fed. Rep. of Germany . |
| 3046179 | 7/1982 | Fed. Rep. of Germany . |
| 3152587 | 1/1983 | Fed. Rep. of Germany . |
| 8707478 | 8/1987 | Fed. Rep. of Germany . |
| 437519 | 7/1971 | U.S.S.R. . |
| 0287932 | 1/1929 | United Kingdom . |
| 0540215 | 10/1941 | United Kingdom . |
| 562103 | 12/1942 | United Kingdom . |
| 903173 | 4/1960 | United Kingdom . |
| 1234413 | 8/1968 | United Kingdom . |
| 1280357 | 6/1969 | United Kingdom . |
| 2046613 | 11/1980 | United Kingdom . |
| 2158364 | 11/1985 | United Kingdom . |

Primary Examiner—Robert A. Dawson
Assistant Examiner—W. L. Millard
Attorney, Agent, or Firm—Leydig, Voit & Mayer

[57] ABSTRACT

The disclosure describes a filter device which comprises at least an outer and an inner hollow filter element, each having first and second ends. A first end cap is sealed to the first end of the inner filter element. A second end cap is sealed to the second ends of the outer and inner filter elements wherein the inner filter element is disposed inside and spaced from the outer filter element. The inner filter element can be tapered and can be shorter than the outer filter element. The filter device may further comprise additional filter elements.

17 Claims, 4 Drawing Sheets

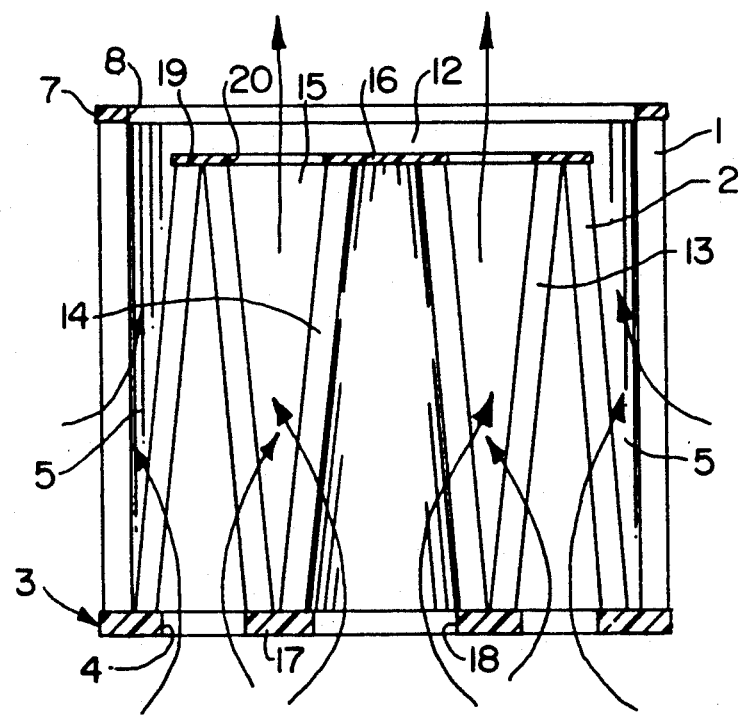

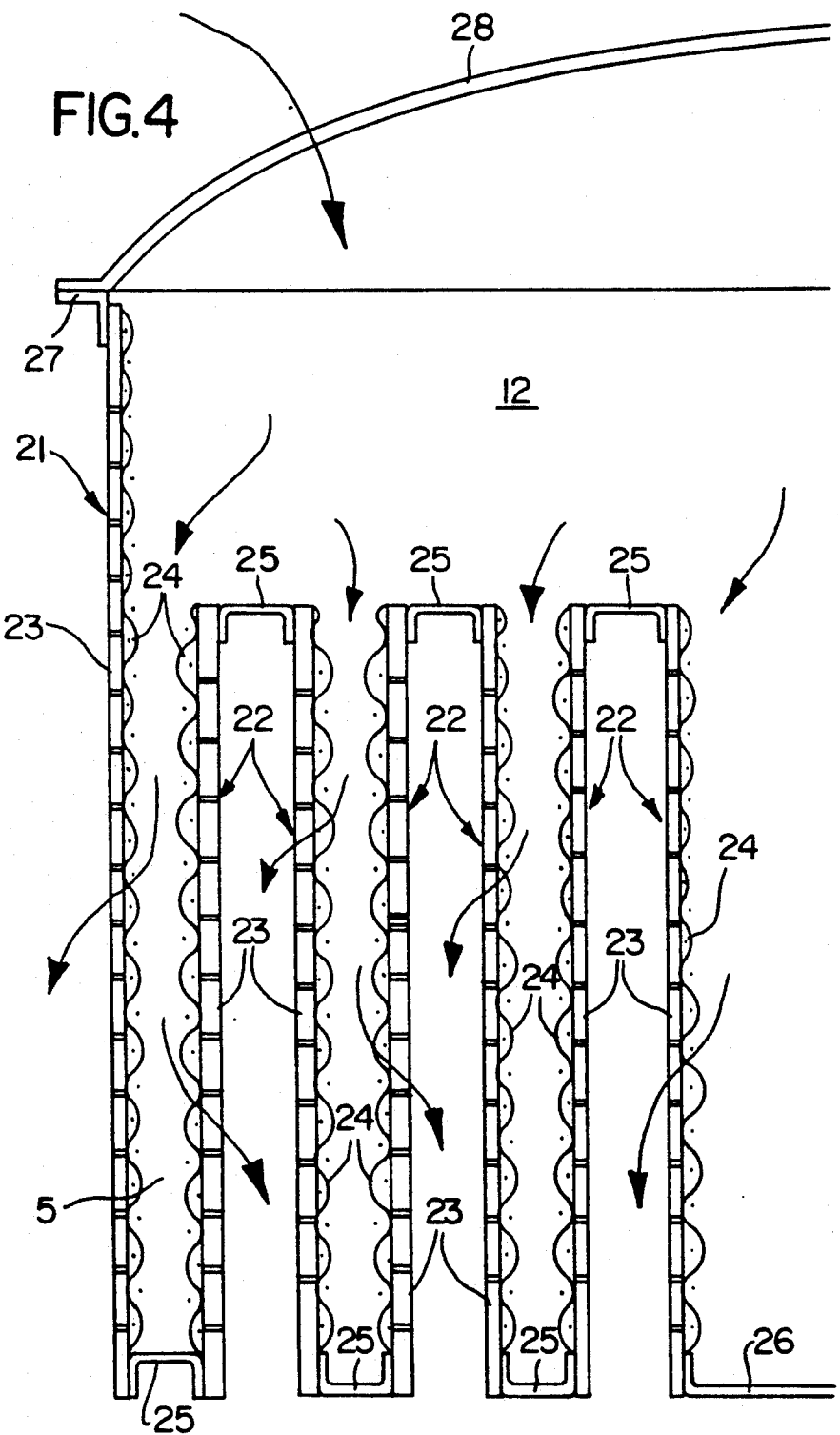

FILTER DEVICE

TECHNICAL FIELD

This invention relates to filters for a fluid, i.e., a gas or a liquid and particularly to filters with improved performance.

BACKGROUND OF THE INVENTION

Filters frequently have to meet very difficult standards. For example, filters for use with internal combustion engines such as are conventionally used on heavy duty vehicles should have a very high dirt capacity, especially when operating in a dust-laden atmosphere, and a low pressure drop across the filter so as not to interfere with the efficient working of the engine. At the same time, these filters must fit within a relatively confined space. A conventional filter for use in such applications comprises a cylindrical pleated filter. A dirty fluid, such as dust-laden air or lube oil containing particulate matter, is passed through the cylindrical filter, either from the outside to the inside or vice versa, and from there passes into the engine. The dirt collects on and in the filter medium of the filter. Therefore, the configuration and surface area of the filter medium have a great impact on the dirt capacity of the filter, i.e., the amount of dirt that can be removed before the filter is completely or effectively clogged.

In an attempt to make the dirt capacity of the filter as large as possible, the pleats have been made quite deep and numerous However, it is found that, practically speaking, the depth of the pleats should not exceed about 2 inches to avoid pleat collapse and minimize pressure losses during use. In addition, placing too many pleats around the circumference results in closed-up pleats, especially at the bottom of the pleats, and consequently restricted fluid egress from the filter. This results in significant pressure losses. Therefore, there are practical limitations on steps that can be taken to increase the effective surface area of the conventional pleated filter, without at the same time increasing the diameter of the filter cylinder. This is usually unacceptable since it results in the filter requiring more space than is available. Such constraints have placed severe restrictions on the design of conventional cylindrical filters. Many of the same considerations limit the design of conventional cylindrical fluid filters in other areas such as filters for turbine lubricating oil and for water.

There is, therefore, a need in the art for a cylindrical fluid filter which has an increased filtering surface area within a given amount of space and at the same time an increased dirt capacity. This need is fulfilled by the filter of the present invention.

DISCLOSURE OF THE INVENTION

A filter device embodying the present invention comprises an outer hollow filter element and at least one inner hollow filter element. The outer and inner filter elements are joined to an end cap with the inner filter element positioned inside and spaced from the outer hollow filter element. In accordance with one aspect of the invention, the space between the outer and inner filter elements is sized to balance mutual objectives such as longest life, lowest pressure drop, etc. For example, the flow velocity of the fluid flowing through the filter element may be kept as high as possible but still give an acceptable pressure drop for maximum performance. In a preferred embodiment, the maximum diameter of the inner filter element is in the range from about 70% to about 95%, and more preferably from about 80% to about 90%, of the inner diameter of the outer filter element.

In accordance with a second aspect of the invention, the length of the inner filter element may be less than the length of the outer filter element. This has the effect of providing an enlarged space above the inner filter element which decreases the pressure drop across the filter device in comparison with a filter in which the outer and inner filter elements are of comparable length. In a preferred embodiment of the invention, the axial length of the inner filter element is in the range from about 50% to about 95%, and more preferably from about 80% to about 90%, of the length of the outer filter element.

In accordance with a third aspect of the invention, the distance between the inner and outer filter elements increases in an axial direction. For example, in a preferred embodiment, the outer filter element is a cylinder and the inner filter element is a portion of a cone which tapers away from the cylindrical outer filter element. The increasing distance allows for a streamline configuration that can maintain a constant flow velocity and, therefore, relatively low pressure losses.

In a fourth aspect of the invention, the filter device can comprise three or more hollow filter elements disposed one inside another. These filter elements are preferably tapered in opposite directions and have the corresponding beneficial effects described above for a single inner filter element.

As will be appreciated, filter elements embodying the present invention can be used to increase the life or dirt capacity and/or lower the pressure loss compared to a conventional filter element within the same allocated space. Alternatively, filters embodying the present invention can match the performance of conventional filter elements within a smaller space.

The filter element may include any suitable filter medium. Suitable filter media include organic and inorganic fibrous materials, such as glass, asbestos, cellulosics, and fibrous organic polymers such as polypropylene, polyamides, polyesters, polyvinylidene fluoride, and the like. Such fibrous materials may be used in conjunction with a bonding agent to improve the coherence of the fibers. Other suitable filter media include woven or non-woven meshes, such as metal, glass, or polymeric mesh,; perforated metal sheet; porous sintered-metal metal; or porous membranes. The pore size of the filter medium will be chosen with the specific application in mind and can in theory range from about 0.25 inch to submicronic. The filter elements may be pleated or not pleated. The pleats can have any suitable depth including, for example, a depth of from about 0.5 inch to about 2 inches for filtering gas and a depth of less than about 1 inch for filtering liquid. In general, the larger pleats can be formed in the outer filter element and pleats with smaller dimensions may be used in the inner and intermediate filter elements In addition, beads of a hot-melt adhesive may be applied circumferentially to the peaks on the upstream and/or downstream side of the pleated filter element in order to provide stability. Typical axial spacing is about 2 inches.

It is often preferred to reinforce the filter elements with porous reinforcing liners. These protect the filters against sudden deforming pressures and make them easier to handle. The use of such liners on at least the outer cylindrical filter element and preferably on all filter elements is, therefore, a preferred feature of this invention. Such liners may be made of perforated metal or polymeric sheets, wire mesh, plastic netting, a spiral wrap of a suitable porous fabric, or any other suitable material that is effective as a reinforcement without significantly adding to the pressure drop across the filter.

The end caps can be formed of any material adapted to seal the ends of the filter elements and prevent bypass of the fluid to be filtered around the filter elements. Often plastic end caps can be used which are heated to melt the plastic locally. This locally molten part is then pushed over the ends until the ends are firmly sealed into the cap. Alternatively, a potting compound can be used together with a shaped cap into which the compound is placed before the ends are embedded therein. Further, the end caps can be welded or brazed to the ends of the filter elements.

DESCRIPTION OF THE DRAWINGS

Each of FIGS. 1, 2, 3, and 4 is a cross-sectional view of an alternative embodiment of the invention.

DESCRIPTION OF PREFERRED EMBODIMENTS

The invention is further described with specific reference to the drawings attached hereto. It is understood, however, that the embodiments described therein are for the purposes of illustration only and are intended to imply no essential limitation on the scope of the invention.

Figure 1:
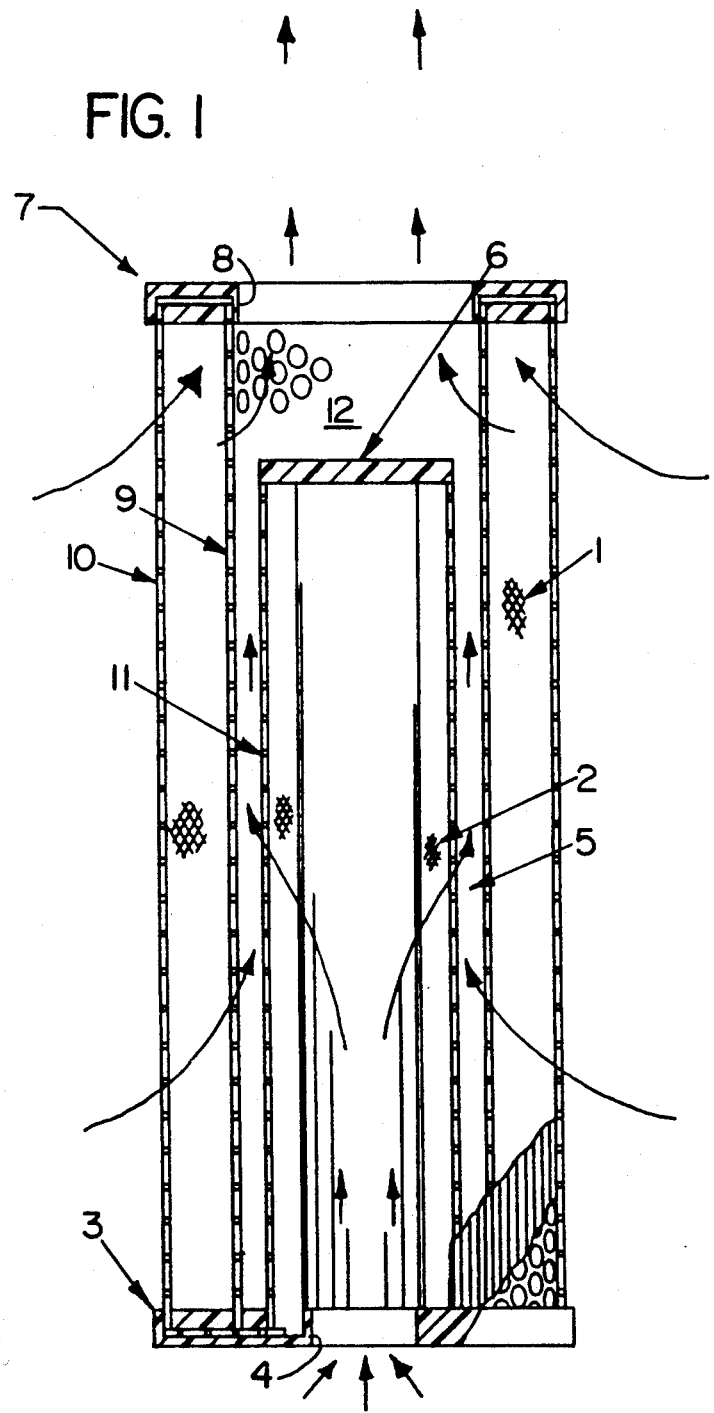

The embodiment described in FIG. 1 comprises an outer cylindrical, axially pleated filter element 1 and an inner cylindrical, axially pleated filter element 2 coaxial with the outer filter element and contained within it. In the preferred embodiment, the axial length of the inner filter element is shorter than that of the outer filter element. One pair of ends of the two elements are sealed into an end cap 3 having a central opening 4 communicating with the interior of the inner filter element. The outer and inner filter elements are joined to the end cap 3 such that the inner filter element is positioned inside and spaced from the outside filter element to define an axial space 5 between them. The opposite end of the inner filter element is closed by a blind end cap 6 which has no opening. The opposite end of the outer filter element is closed by an end cap 7 having a central opening 8 communicating with the interior of the outer filter element. The outer filter element is retained between inner and outer perforated liners 9 and 10, respectively, and the inner filter element is supported by an outer perforated liner 11.

Figure 2:
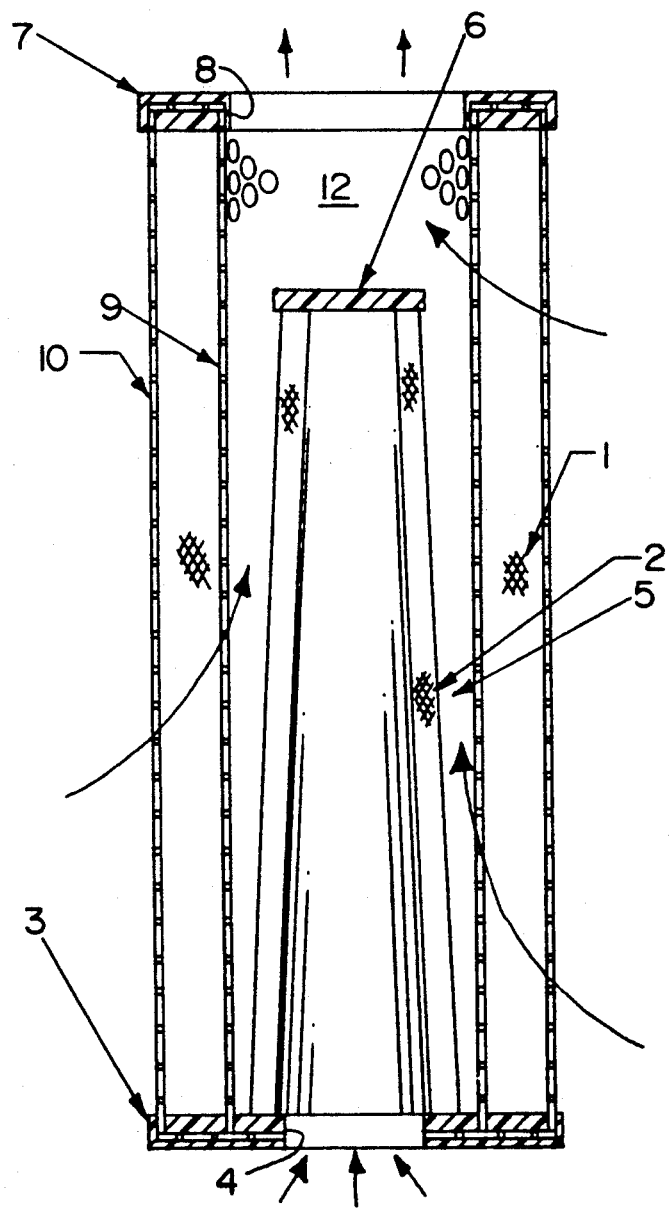

The filter device of the invention shown in FIGS. 1, 2, and 3 is now described in use as an air filter. Air flow is represented by arrows. It is understood, however, that this is for simplicity of illustration only. The filter device of the invention may be retained within a housing, into which is fed dirty air. The air passes through the outer filter element, for example, in the outside/in direction and, in parallel, through the inner filter element in the inside/out direction. In this way, both air flows come together in the axial space 5 between the inner and outer filter elements. From this space 5, the clean air flows into an enlarged space 12 above the shorter inner filter element 2 and then out through the opening 8 in the end cap sealing the end of the outer filter element. By providing the enlarged space 12 above the inner filter element, the preferred filter device shown in FIG. 1 has lower pressure losses than a filter device in which the outer and inner filter elements are of comparable length.

In the embodiment shown in FIG. 2, the inner filter element 2 has the form of a truncated cone but the filter device is in other respects similar to that described in FIG. 1. Providing the inner filter element with the shape of a truncated cone expands the space 5 into which the air flows after leaving the filter elements so as to result in an even smaller pressure drop across the filter device In particular, because the inner filter element 2 has an axial taper, the distance between the inner and outer filter elements increases in the axial direction away from the end cap 3 joining the first and second filter elements This provides a streamlined configuration that can maintain a constant flow velocity and low pressure losses. In addition, the flow on the inside of the conical inner filter element 2 is also automatically streamlined. As the air flows up through the conical inside of the inner filter element 2, the flow area decreases but so does air flow because some of the air passes through the inner filter element. A preferable flow configuration occurs when the inlet flow velocity through the opening 4 in the lower end cap 3 equals the approach velocity on the outside cylinder and is kept constant through all passages to and from the filter elements 1, 2.

A preferred inner filter element of the embodiment shown in FIG. 2 are in the form of a truncated cone with an outer diameter at the larger end that is from about 1.10 to about 2.5, and more preferably from about 1.25 to about 2.0, times the outer diameter at the closed, narrower end.

In the embodiment described in FIG. 3, a filter device is illustrated that has essentially the configuration of that shown in FIG. 2, with the addition of a pair of inner pleated filter elements 13 and 14. The additional inner filter elements 13, 14 are preferably also tapered and alternately inverted so they define a space 15 in which the distance between the additional inner filter elements also increases in the axial direction away from the end cap 3 joining the outer and first inner filter elements 1, 2.

Although the axial lengths of the inner filter elements may differ, in the preferred embodiment shown in FIG. 3 they are equal. Further, although in the illustrated embodiment the inner filter elements have a generally conical configuration, they can have other configurations including a cylindrical configuration. One end of the innermost filter element 14 is closed by a blind end cap 16 having no opening. The other end of the innermost filter element 14 and an end of the second inner filter element 13 are sealed to an annular blind end cap 17 having an opening 18 which allows fluid communication with the interior of the innermost filter element 14. Finally, the other end of the second inner filter element 13 and an end of the first inner filter element 2 are joined to a blind annular end cap 19 which has an opening 20 that allows air to flow from the space 15 into the space 12 and then through the opening 8. The upper end caps 16, 19 may be separate or formed as a one-piece assembly having the opening 20. Similarly, the lower end caps 3, 17 may be separate or formed as a one-piece assembly having the openings 4, 18.

In use, the additional filter elements 13, 14 act to increase the dirt capacity of the filter device even further and reduce the pressure drop across the filter.

Clearly, if the inner dimensions of the outer filter element are sufficiently great, there is no reason why more than two additional inner filter elements could not be used.

In the embodiment described in FIG. 4, the filter device comprises an outer filter element 21 and a plurality of inner filter elements 22. In a preferred filter device as shown in FIG. 4, each of the filter elements has a cylindrical configuration and each of the inner filter elements 22 has the same axial length, which is less than the axial length of the outer filter element 21. Each filter element includes a perforated liner 23 and a mesh 24 disposed along the upstream surface of the perforated liner. The liner 24 may be formed form any suitable material, including a metal or a polymer. The mesh may also be formed from a metal or a polymer and may be woven, non-woven, pleated, or non-pleated. For example, a metal wire mesh may be spot welded to the upstream surface of a metal perforated liner. Each of the filter elements are joined to an adjacent filter element by an annular end cap 25. The lower end of the innermost filter element is closed by a blind end cap 26. Each of the end caps, which are preferably metal but can be any suitably impervious material, may be joined to the filter elements by welding or brazing or by bonding with an adhesive.

In use, the embodiment of FIG. 4 may, for example, be a strainer for filtering lube oil. The oil flows may be extremely high, e.g., 700 to 2,500 gpm, and the pressure drop across the strainer may be kept extremely low, e.g., less than 0.1 psid. The lube oil would flow into the top of the filter device and then inside/out through the outer filter element 21 and alternating inner filter elements 22 while flowing outside/in through the remaining inner filter elements 22. The wire mesh then removes undesirable particulate matter from the oil. The strainer is frequently mounted to a reservoir by means of a lip 27 and can easily be removed by a strap 28 at the top. Since the strainers are cleanable, sufficient space must be provided between adjacent filter elements to allow access for cleaning.

Although the present invention has been described in terms of several embodiments, it is not limited to those embodiments. Alternative embodiments and modifications, which would still be encompassed by the invention, may be made by those skilled in the art particularly in light of the foregoing teachings. Therefore, the following claims are intended to cover any alternative embodiments, modifications, or equivalents which may be included within the spirit and scope of the invention as defined by the claims.

What is claimed is:

1. A filter device comprising:
    an outer, hollow filter element having first and second ends and axially extending pleats;
    an inner, hollow filter element having first and second ends and axially extending pleats;
    a first end cap sealed to the first end of the inner filter element;
    a second end cap sealed to the first end of the outer filter element and defining an opening; and
    a third end cap sealed to the second ends of the inner and outer filter elements wherein the inner filter element is disposed inside and spaced from the outer filter element, the space between the filter elements communicating with the opening in the second end cap and the distance between the inner and outer filter elements increasing in the direction away from the third end cap.

2. The filter device of claim 1 wherein the inner filter element has the form of a truncated cone with the first end being the narrower end.

3. The filter device of claim 1 wherein the axial length of the inner filter element is less than the axial length of the outer filter element.

4. The filter device of claim 1 further comprising a perforated liner positioned along at least one side of the outer filter element.

5. The filter device of claim 4 further comprising a perforated liner on at least one side of each filter element.

6. The filter device of claim 1 wherein the first end cap does not have an opening.

7. A filter device comprising:
    at least first, second, and third hollow filter elements, each having first and second ends and axially extending pleats;
    a first end cap sealed to the first end of the first filter element and defining an opening;
    a second end cap sealed to the second ends of the first and second filter elements wherein the second filter element is disposed inside and spaced from the first filter element, the second end cap defining an opening which communicates with the inside of the second filter element;
    a third end cap sealed to the first ends of the second and third filter elements wherein the third filter element is disposed inside and spaced from the second filter element, the third end cap defining an opening; and
    a fourth end cap sealed to the second end of the third filter element, wherein the space between the first and second filter elements communicates directly with the opening in the first end cap and the inside of the third filter element communicates with the opening in the first end cap via the opening in the third end cap.

8. The filter device of claim 7 wherein at least one of the second and third filter elements have an axial length less than the axial length of the first filter element.

9. The filter device of claim 8 wherein the axial lengths of the second and third filter elements are equal.

10. The filter device of claim 7 wherein the distance between the first and second filter elements increases in a direction from the second to the first end of the first filter element.

11. The filter device of claim 10 wherein at least one of the second and third filter elements has the form of a truncated cone.

12. The filter device of claim 11 wherein each of the second and third filter elements has the form of a truncated cone, the third filter element being inverted with respect to the second filter element.

13. A filter device for removing particulates from a fluid flowing through the device, the filter device comprising:
    at least first and second hollow filter elements, each having first and second ends and including a perforated liner and a wire mesh disposed along the upstream surface of the perforated liner, the first end of the first filter element defining an opening;
    a first end cap joined to the first end of the second filter element; and
    a second end cap joined to the second ends of the first and second filter elements wherein the second filter element is disposed inside and spaced from the first filter element, the space between the first and second filter elements communicating with the opening.

14. The filter device of claim 13 wherein the axial length of the second filter element is less than the axial length of the first filter element.

15. The filter device of claim 14 wherein the axial length of the second filter element is no greater than about 50% of the axial length of the first filter element.

16. The filter device of claim 15 wherein each of the first and second filter elements comprises a right circular cylinder.

17. The filter device of claim 16 further comprising at least a third filter element and a third end cap wherein the third filter element has first and second ends and includes a perforated liner and a wire mesh disposed along the upstream surface of the perforated liner, the first end cap is joined to the first ends of the second and third filter elements with the third filter element disposed inside and spaced from the second filter element, and the third filter element, the interior of the third filter element communicating with the opening.

* * * * *

UNITED STATES PATENT AND TRADEMARK OFFICE
CERTIFICATE OF CORRECTION

PATENT NO. : 5,152,890

DATED : October 6, 1992

INVENTOR(S) : Staffan B. Linnersten

It is certified that error appears in the above-identified patent and that said Letters Patent is hereby corrected as shown below:

On the title page:

Item no. 56, References Cited, U.S. Patent Documents, change "4,783,271  1/1988  Silverwater  210/315" to --4,783,271  11/1988  Silverwater  210/315--.

Item no. 56, References Cited, Foreign Documents, change "0287932  1/1929  United Kingdom" to --0287932  1/1927  United Kingdom--.

Claim 17, column 8, line 12, after "third" (first occurrence) insert --end cap is joined to the second end of the third--.

Signed and Sealed this

Twenty-eighth Day of September, 1993

Attest:

BRUCE LEHMAN

Attesting Officer

Commissioner of Patents and Trademarks